(12) United States Patent
Hodgson et al.

(10) Patent No.: US 12,525,829 B2
(45) Date of Patent: Jan. 13, 2026

(54) COMPOSITE STATOR SLEEVE FOR ELECTRIC MACHINE

(71) Applicants: Rolls-Royce Corporation, Indianapolis, IN (US); Rolls-Royce North American Technologies, Inc., Indianapolis, IN (US)

(72) Inventors: Benedict N. Hodgson, Indianapolis, IN (US); Robert W. Heeter, Indianapolis, IN (US); Alan W. Smith, Indianapolis, IN (US); Hossein Baninajar, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 208 days.

(21) Appl. No.: 18/470,261

(22) Filed: Sep. 19, 2023

(65) Prior Publication Data

US 2025/0096623 A1    Mar. 20, 2025

(51) Int. Cl.
*H02K 1/18* (2006.01)
*H02K 1/04* (2006.01)
(Continued)

(52) U.S. Cl.
CPC .............. *H02K 1/18* (2013.01); *H02K 1/04* (2013.01); *H02K 1/20* (2013.01); *H02K 7/1823* (2013.01); *H02K 15/12* (2013.01); *F02C 7/00* (2013.01)

(58) Field of Classification Search
CPC .. H02K 1/18; H02K 1/04; H02K 1/20; H02K 7/1823; H02K 15/12; H02K 5/128; H02K 5/203; F02C 7/00
(Continued)

(56) References Cited

U.S. PATENT DOCUMENTS 6,467,725 B1    10/2002  Coles et al.
7,468,561 B2    12/2008  Kern et al.
(Continued)

OTHER PUBLICATIONS

A.T. Andonian et al., "Rotor Retention and Loss Reduction for High-Speed Permanent Magnet Motor Generators", Calnetix Technologies, LLC, 2020, 9 pp., (Applicant points out, in accordance with MPEP 609.04(a), that the year of publication, 2020, is sufficiently earlier than the effective U.S. filing date, so that the particular month of publication is not an issue.).
(Continued)

*Primary Examiner* — Christopher M Koehler
*Assistant Examiner* — Viswanathan Subramanian
(74) *Attorney, Agent, or Firm* — Shumaker & Sieffert, P.A.

(57) ABSTRACT

A stator housing assembly includes a stator housing and a stator sleeve. The stator sleeve including a combination of composite layers with different high strength fibers. The stator housing includes a first end section and a second end section that define a stator cavity configured to contain a pressurized cooling fluid. The stator sleeve defines a longitudinal axis and includes a plurality of layers of composite materials that include more than one high strength fiber material. High strength fibers may include carbon and glass fibers. Portions of the stator sleeve may have different combinations of high strength fiber materials and fiber orientations to optimize sleeve properties.

17 Claims, 6 Drawing Sheets

(51) Int. Cl.
*H02K 1/20* (2006.01)
*H02K 7/18* (2006.01)
*H02K 15/12* (2006.01)
*F02C 7/00* (2006.01)

(58) Field of Classification Search
USPC .............................. 310/86, 156.28, 156.27
See application file for complete search history.

(56) References Cited

U.S. PATENT DOCUMENTS

| | | | |
|---|---|---|---|
| 7,841,163 | B2 | 11/2010 | Welch et al. |
| 7,952,244 | B2 | 5/2011 | Colin |
| 8,237,320 | B2 | 8/2012 | Saban et al. |
| 8,492,920 | B2 | 7/2013 | Huang et al. |
| 8,657,566 | B2 | 2/2014 | Bedrine et al. |
| 10,122,228 | B2 | 11/2018 | Chong et al. |
| 2006/0137355 | A1 | 6/2006 | Welch et al. |
| 2010/0019626 | A1* | 1/2010 | Stout .................. H02K 3/50 310/214 |
| 2016/0172923 | A1* | 6/2016 | Claycomb ............ H02K 5/128 310/86 |
| 2022/0278584 | A1* | 9/2022 | Høyland ................ H02K 1/278 |
| 2022/0294302 | A1* | 9/2022 | Berendes ............... H02K 5/128 |

OTHER PUBLICATIONS

Denkena et al., "Cooling of motor spindles—a review", The International Journal of Advanced Manufacturing Technology, Sep. 21, 2020, 22 pp.

F. Zhang et al., "Rotor Retaining Sleeve Design for a 1.12-MW High-Speed PM Machine", IEEE Transactions on Industry Applications, vol. 51, No. 5, Sep. 2015, pp. 3675-3685.

M. Popescu, "Electrification: Need for innovative solutions in electrical machines for automotive traction units", CADFEM Technology Day, Jun. 26, 2020, 48 pp.

N. Fernando, "High speed permanent magnet machine design with minimized stack-length under electromagnetic and mechanical constraints", International Journal of Applied Electromagnetics and Mechanics, Jun. 2014, 20 pp.

Z. Xu et al., "A Semi-Flooded Cooling for a High Speed Machine: Concept, Design and Practice of an Oil Sleeve", 43rd Annual Conference of the IEEE Industrial Electronics Society, Oct. 2017, 6 pp.

* cited by examiner

COMPOSITE STATOR SLEEVE FOR ELECTRIC MACHINE

GOVERNMENT RIGHTS

This invention was made with Government support under Grant Contract Number FA8650-19-D2063 and Grant Contract Number FA8650-19-F-2078 awarded by Air Force Research Laboratory (AFRL). The Government has certain rights in the invention.

TECHNICAL FIELD

The present disclosure generally relates to stator sleeves, such as stator sleeves for use with an electric machine.

BACKGROUND

Electric machines can be used as motors or generators in numerous applications and some electric machines are used inter-changeably as both in the same application depending on if they are being driven or driving. The size and power of electric machines are strongly impacted by the ability to cool the stator and stator windings. Therefore, higher power density machines require better cooling to remove heat and avoid the machine exceeding its temperature limits. Cooling by flooding the stator cavity with cooling fluid or spray cooling are both options to improve the cooling of the stator that allow higher machine power density. But this leads to the problem of how to avoid the coolant in the stator-to-rotor gap where churning could generate considerable heat and how to contain the cooling fluid pressures required to provide high cooling flow and promote optimum cooling flow. For example, the electric machine may include a cooling jacket or other sealed cooling system to flow the cooling medium near one or more surfaces of the electric machine. If a sleeve is employed as part of the cooling jacket in-between the rotor and stator that allows pressurized cooling fluid, then this sleeve needs to be as thin as possible and also very rigid to avoid increasing the stator-to-rotor gap due to deflections and growth. Since increasing the stator-to-rotor gap will reduce machine power capability and require the machine to be larger.

SUMMARY

The disclosure describes example assemblies, systems, and techniques for cooling components of an electric machine. An electric machine, such as a generator of a gas turbine engine, converts electrical power to and/or from mechanical power, and includes a stator and a rotor. The stator typically includes a stationary stack of cobalt-iron or silicon steel laminations glued or welded together, also referred to as stator core or lamination stack, with copper or aluminum windings positioned into the slots of lamination stack. The rotor includes permanent magnets that rotate relative to and in close proximity to the stator. For an internal rotor configuration, the rotor rotates inside the stator, and for an external rotor configuration, the rotor rotates outside the stator.

To cool the stator, a cooling fluid, such as a cooling oil, is circulated through a stator housing assembly to directly remove heat from the stator and transfer at least a portion of the removed heat to a fluid circulation system. The stator housing assembly includes a stator housing and a stator sleeve that contain the pressurized cooling fluid within a stator cavity. The stator sleeve includes multiple layers of composite materials that include more than one high strength fiber material. The high strength materials support the stator sleeve and limit radial deflection of the stator sleeve in response to thermal or pressure transients. As a result, the electric machine may be capable of maintaining a relatively small gap between the permanent magnets of the rotor and the stator core of the stator.

The stator sleeve may have properties that vary along a length of the stator sleeve. These properties may result from a composition and direction of orientation of the high strength fiber materials. A composition and direction of orientation of the high strength fiber materials may vary along the length of the stator sleeve, thereby reducing radial deflections in a center of the stator sleeve due to a change in temperature or pressure. The variation in composition and orientation of the high strength fiber materials may provide the stator sleeve with a variable coefficient of thermal expansion (CTE) along the length of the stator sleeve. For example, the stator housing may be fabricated from a material having a relatively high CTE, such that the stator housing may radially expand a substantial amount during a thermal transient. In response to these thermal transients, the stator sleeve maintains both a relatively constant force against the stator housing to seal against O-rings and a relatively small gap between the permanent magnets and stator laminations without interfering with the rotor or stator laminations. For example, end portions of the stator sleeve may have a relatively high CTE compared to a medial portion of the stator sleeve. As a result, the end portions of the stator sleeve may expand along with the stator housing and exert a relatively constant force on O-rings positioned on the stator housing that seal the cooling fluid within the stator cavity. At the same time, the medial portion of the stator sleeve, positioned between the rotor and the stator, may expand to a lesser degree than the end portions of the stator sleeve or may even contract a small amount, such that the permanent magnets of the rotor and the lamination stack of the stator may be positioned closer together, thereby increasing an efficiency of the electric machine and/or increasing a flow rate of cooling fluid within, rather than around, the stator.

To achieve a stator sleeve having a variable CTE, the stator sleeve may include high strength fiber materials having different thermal properties that are present in different proportions at different portions of the stator sleeve. For example, the stator sleeve may include both relatively high CTE glass fibers and relatively low CTE carbon fibers. The end portions of the stator sleeve may have a higher proportion of glass fibers compared to the medial portion of the stator sleeve, while the medial portion may have a higher proportion of carbon fibers compared to the end portions. The carbon fibers may be oriented circumferentially around the stator sleeve to provide high hoop strength and high hoop stiffness of the stator sleeve, which may reduce deflections of the stator sleeve due to the pressure of the coolant and allow smaller stator-to-rotor gaps. Additionally, composite plies with unidirectional carbon fibers orientated in the circumferential direction may be less susceptible to eddy current losses that may otherwise circulate in bi-directional composite plies with circumferential and longitudinally-oriented carbon fibers. The glass fibers may be oriented multi-directionally, such as longitudinally and circumferentially, to increase a longitudinal and hoop strength of the stator sleeve, and may line an inner and/or outer surface of the stator sleeve to provide both a mechanical and galvanic protective outer layer for the stator sleeve. The glass inner and outer surface may also provide a more durable sleeve surface that is more capable to sustain contact and damage during operation and assembly without significant impact to the strength and integrity of the sleeve. Inclusion of a stator sleeve to isolate a flooded stator from the rotor permits higher speeds which otherwise produced a large friction loss.

In this way, electric machines that include a stator sleeve as described herein may contain the cooling fluid within the stator cavity with a robust and durable design and enable higher efficiency with low eddy current losses. Glass fibers and the resin in the composite plies are not conductive, which prevents eddy currents. The carbon fibers are conductive, but when orientated in the circumferential direction, avoid any significant conduction area thus reducing the eddy currents. For portions of the sleeve that are not in the stator-to-rotor gap the magnetic fields will be much lower and thus the risk for eddy currents will be lower even for bi-directional carbon fibers plies.

In some examples, the disclosure describes a stator housing assembly that includes a stator housing and a stator sleeve. The stator housing defines a stator cavity configured to contain a pressurized cooling fluid. The stator sleeve defines a longitudinal axis and is configured to encase the stator cavity. The stator sleeve includes a plurality of layers of composite materials that include more than one high strength fiber material.

In some examples, the stator sleeve described above may include a first scaling portion configured to position against a first end section of the stator housing, a second sealing portion configured to position against a second end section of the stator housing, and a medial portion between the first and second sealing portions. A coefficient of thermal expansion (CTE) of each of the first and second sealing portions is greater than a CTE of the medial portion. Also, the hoop strength and stiffness of the medial portion may be designed to minimize deflection due to the pressure exerted by the cooling fluid and the end sections may be designed to optimize the stress in the housing by matching the thermal growth of the housing. The addition of carbon fiber in the stator-rotor gap is feasible without significant eddy current loss when applied only in the circumferential orientation.

In some examples, the disclosure describes an electric machine that includes a shaft, a rotor, a stator, and a stator housing assembly. The rotor is coupled to the shaft and includes permanent magnets. The stator includes one or more stator laminations separated from the rotor by a radial gap. The stator housing assembly includes a stator housing and a stator sleeve. The stator housing includes a first end section and a second end section that define a stator cavity configured to contain a pressurized cooling fluid. The stator is positioned within the stator cavity. The stator sleeve defines a longitudinal axis and is positioned against the first and second end sections of the stator housing and within the radial gap. The stator sleeve includes a plurality of layers of composite materials that include more than one high strength fiber material. In response to thermal transients within an operating range of the electric machine, the stator sleeve is configured to maintain a seal against the first and second end sections and a relatively small rotor gap from the rotor and stator gap from the stator.

In some examples, the disclosure describes a method of fabricating a stator sleeve that includes laying-up a plurality of plies with high strength fibers and resin and polymerizing the resin to form the stator sleeve. The resulting stator sleeve defines a longitudinal axis and includes a plurality of layers of composite materials that include more than one high strength fiber material.

The details of one or more examples are set forth in the accompanying drawings and the description below. Other features, objects, and advantages will be apparent from the description and drawings, and from the claims.

DETAILED DESCRIPTION

Figure 1:
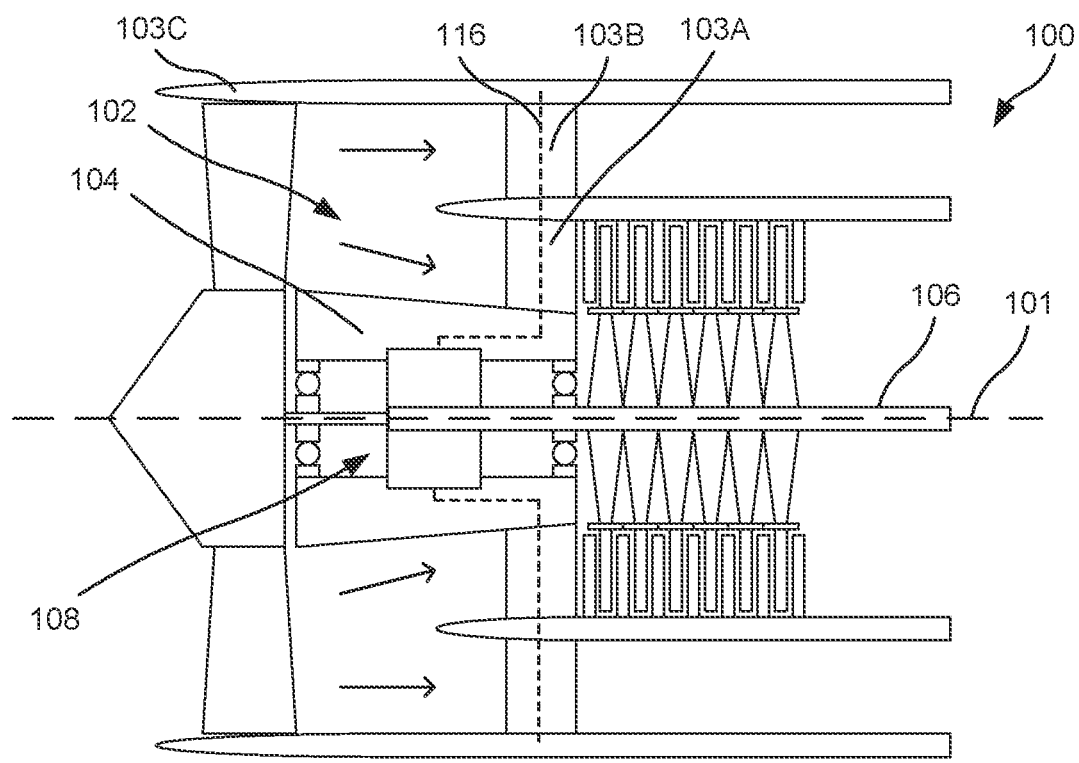
FIG. 1 is a cross-section side view diagram illustrating an example gas turbine engine that includes an electric machine.

The disclosure describes example assemblies, systems, and techniques for cooling an electric machine. Such an electric machine may be part of a gas turbine engine system. FIG. 1 is a cross-section side view diagram illustrating an example gas turbine engine 100 that includes an embedded electric machine 108. While described in FIG. 1 with respect to gas turbine engine 100 as an embedded electric machine 108, electric machine 108 may be a part of other systems and/or may not be embedded.

Gas turbine engine 100 includes an exterior casing 103C, an engine core 102 coupled to casing 103C through an inner vane 103A and an outer vane 103B, and a shaft 106 rotatably mounted to an engine core 102 along a longitudinal axis 101. In the example of FIG. 1, gas turbine engine 100 illustrates a turbofan gas turbine engine having one or more gas flow paths between exterior casing 103C and interior internal engine 102; however, in other examples, gas turbine engine 100 may include other types of gas turbine engines used for aircraft or other vehicles, such as turbojets.

Engine core 102 is configured to house various components, such as one or more engine frames 104 or housings, a compressor rotor (not labeled), a combustor (not shown), and a turbine rotor (not shown) coupled to the compressor rotor via shaft 106. A physical configuration of a fan section, a compressor section, and a turbine section (not shown) are driven by working fluid requirements of a thermodynamic cycle of gas turbine engine 100. Each of the compressor rotor and the turbine rotor include longitudinally-spaced discs mounted to shaft 106 and separated by interstage spacers also mounted to shaft 106. Each disc supports a circumferential array of blades. Adjacent to the respective compressor and turbine rotors, engine core 102 supports vane assemblies that are longitudinally interspaced with the circumferential arrays of blades. Each vane assembly includes a circumferential array of vanes that extend inward from engine frames 104 inside engine core 102. Vane dimensions may be optimized for aerodynamic performance (low flow resistance) and maximal variability of flow area as the vanes are rotated.

In addition to housing the gas flow path components described above, engine core 102 is configured to house electric machine 108. In the example of FIG. 1, electric machine 108 is positioned forward of a compressor section due to a relatively lower temperature upstream of the compressor section and/or ease of accessibility of electric machine 108; however, in other examples, electric machine 108 may be positioned in portions of the engine frame 104 corresponding to other sections of gas turbine engine 100, such as the turbine section, a combustion section, a fan section, or a propulsion section. Electric machine 108 may be configured to convert mechanical power to and/or from electrical power. Electric machine 108 may include any of a variety of systems including, but not limited to, generators, starters, combined starters/generators, motors, or the like. Electric machine 108 may be used in a variety of applications including, but not limited to, electrical power generation, propulsion, and the like.

In the example of FIG. 1, electric machine 108 is an embedded electric machine. For example, electric machine 108 may be used in aircraft or watercraft applications in which space, weight, and longevity of components may be important for safety and/or efficiency, and in which opportunities for performing maintenance may be limited during operation. Rather than locate electric machine 108 away from shaft 106 via one or more offtake shafts, electric machine 108 may be housed within engine frame 104, along with the other power generating components, and directly coupled to the main shaft. Such an embedded electric machine 108 may reduce an overall weight and complexity of gas turbine engine 100 compared to gas turbine engines in which an electric machine is away from longitudinal axis 101.

Electric machine 108 includes a stator that includes windings and a stator core. During operation, the windings and stator core produce large amounts of heat. To directly cool the components of the stator, a cooling fluid, such as a cooling oil, is circulated through a stator cavity formed by a stator housing assembly to directly remove heat from components of the stator and transfer at least a portion of the removed heat to a cooling fluid system coupled to the stator cavity through cooling fluid channels 116. The stator housing assembly includes a stator housing and a stator sleeve that contain the pressurized cooling fluid within the stator cavity. As will be described in more detail below, the stator sleeve is configured to maintain a relatively constant force against the stator housing, a relatively small gap between permanent magnets of the rotor and the stator core, and a low amount of eddy current losses that may be induced during operation of electric machine 108. For example, for a stator sleeve having a thickness of about 3 mm, reducing deflection of the stator sleeve by about 0.5 mm may reduce an air gap from 1.5 mm to about 1 mm, and correspondingly, may increase machine power by an inverse ratio of the total gaps, such as about 12.5% in the above example.

Figure 2A:
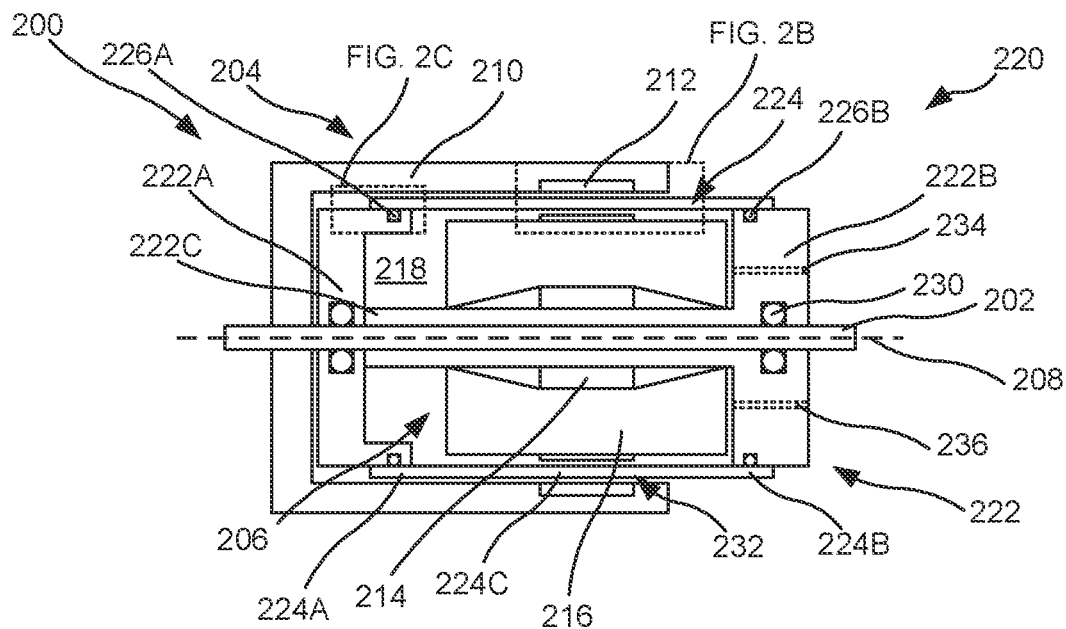
FIG. 2A is a cross-section side view diagram illustrating an example electric machine having an external rotor and an internal stator.
Figure 3:
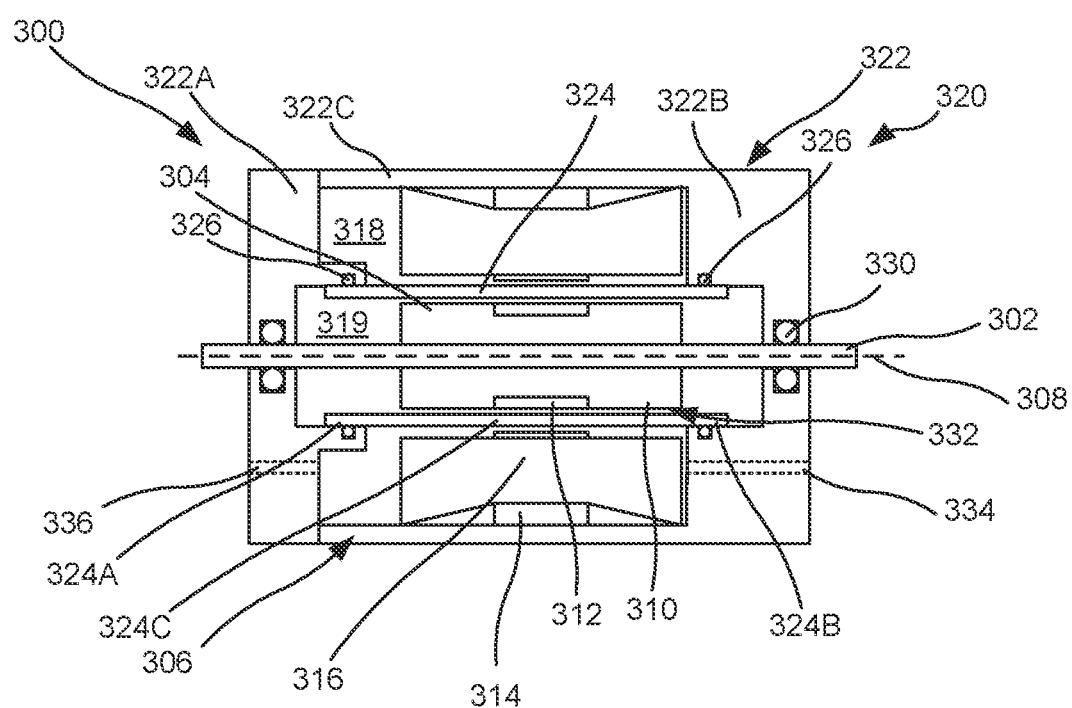
FIG. 3 is a cross-section side view diagram illustrating an example electric machine having an internal rotor and an external stator.

FIG. 2A is a cross-section side view diagram illustrating an example electric machine 200. Electric machine 200 includes a shaft 202, a rotor 204, a stator 206, and a stator housing assembly 220. In the example of FIG. 2A, rotor 204 is positioned external to stator 206 and configured to rotate around stator 206; however, in other examples, such as illustrated in FIG. 3 below, rotor 204 may be positioned internal to stator 206 and configured to rotate within stator 206. Rotor 204 is mechanically coupled to shaft 202. Rotor 204 includes a rotor body 210 and a permanent magnet assembly 212 positioned on an internal surface of rotor body 210. Permanent magnet assembly 212 includes one or more permanent magnets. Stator 206 includes a stator core 214 and stator windings 216 dispersed around stator core 214. An outer surface of stator 206, such as an outer radial surface of stator core 214, is separated from magnets 212 of rotor 204 by a radial gap 232. An amount of power transferred between rotor 204 and stator 206 may be related to a proximity of magnets 212 to stator core 214, such that reducing radial gap 232 may increase an efficiency of electric machine 200.

Stator housing assembly 220 includes a stator housing 222 and a stator sleeve 224. Stator housing 222 is configured to mechanically support components of stator 206 and, in some instances, other components of electric machine 200, such as shaft 202 through bearings 230. Stator housing 222 may be formed from a variety of rigid materials including, but not limited to, titanium, aluminum, stainless steel, or other metals and/or metal alloys configured to operate at relatively high temperatures and, in some instances, weight-sensitive environments, such as aerospace or hypersonic applications.

In the example of FIG. 2A, stator housing 222 includes a first end section 222A, a second end section 222B, and a radial section 222C that together define a stator cavity 218. While second end section 222B and radial section 222C are illustrated as being monolithic and separate from first end section 222A, stator housing 222 may include one or more portions having any of a variety of arrangements that define end portions for contacting stator sleeve 224. First end section 222A may be separable from second end section 222B and radial section 222C to enable disassembly of and access to stator cavity 218, while radial section 222C and radially inward surfaces of end sections 222A and 222B may define a cavity for shaft 202 to rotate.

Stator cavity 218 is configured to house stator 206, such that stator 206 may be positioned within stator cavity 218. Stator cavity 218 is configured to contain a pressurized cooling fluid. Stator housing 222 includes at least one inlet 234 and at least one outlet 236 configured to fluidically couple to a cooling fluid system. Inlet 234 is configured to receive the pressurized cooling fluid into stator cavity 218 from the cooling fluid system, while outlet 236 is configured to discharge the pressurized cooling fluid from stator cavity 218 back to the cooling fluid system. In some examples, inlet 234 and outlet 236 may be positioned on different sides of stator core 214, such that cooling fluid may travel through stator core 214 from inlet 234 through outlet 236. For example, stator core 214 includes slots that house windings 216, and these slots may also direct cooling fluid through stator core 214 to contact a large surface area of stator core 214. In some examples, stator housing 222 may include structures, such as baffles or nozzles, configured to further distribute the cooling fluid through stator cavity 218 to contact surfaces of stator core 214 and stator windings 216.

Stator sleeve 224 surrounds a longitudinally central portion of stator housing 222 and defines a longitudinal axis 208. As will be described further below, stator sleeve 224 includes a plurality of layers of composite materials that include more than one high strength fiber material. In some examples, a composition and direction of orientation of the high strength fiber materials varies along longitudinal axis 208. As such, stator sleeve 224 may have one or more portions that are defined by substantially similar compositions and/or orientations of the high strength fiber materials. The number and size of such portions may depend on a particular configuration of the electric machine, such as a relative configuration of stator housing 222 and rotor 204. In the example of FIG. 2A, stator sleeve 224 includes a first sealing portion 224A positioned against first end section 222A of stator housing 222, a second sealing portion 224B positioned against second end section 222B of stator housing 222, and a medial portion 224C between first and second sealing portions 224A and 224B and positioned in radial gap 232. Medial portion 224C forms a lateral fluid boundary of stator cavity 218.

Stator housing 222 and stator sleeve 224 are configured to seal stator cavity 218, such that the cooling fluid may only enter and exit from stator cavity 218 through inlet 234 and outlet 236. An outer radial surface of each of first and second end sections 222A and 222B of stator housing 222 includes one or more grooves extending around longitudinal axis 208. Some grooves are configured to receive at least one O-ring 226 and position O-ring 226 radially outward. To seal stator cavity 218, stator sleeve 224 is positioned against first and second end sections 222A and 222B of stator housing 222 and within radial gap 232. First sealing portion 224A of stator sleeve 224 is configured to position against a first O-ring 226A positioned around first end section 222A of stator housing 222, and second sealing portion 224B of stator sleeve 224 is configured to position against a second O-ring 226B positioned around second end section 222B of stator housing 222. A force exerted on O-rings 226 may be sufficiently high that the cooling fluid is sealed within stator cavity 218 and sufficiently low that O-rings 226 are not damaged.

During operation, components of stator 206 may generate heat, which may correspondingly heat portions of stator housing 222 and cause stator housing 222 to expand radially outward from longitudinal axis 208. If stator sleeve 224 is formed from a material having a relatively low coefficient of thermal expansion, the expansion force from stator housing 222 may pinch O-rings 226 between stator housing 222 and stator sleeve 224, causing degradation of O-rings 226 and reducing a sealing capability of O-rings 226. However, accommodating expansion of stator housing 222 by more closely matching a CTE of stator sleeve 224 to that of stator housing 222 may result in expansion stator sleeve 224 in radial gap 232, requiring a bigger radial gap 232 to avoid contact between stator 206 and rotor 204. To maintain a constant force on O-rings 226 while enabling a small radial gap 232, stator sleeve 224 may be configured with a variable CTE, such that a CTE of each of first and second sealing portions 224A. 224B is greater than a CTE of medial portion 224C.

Figure 2B:
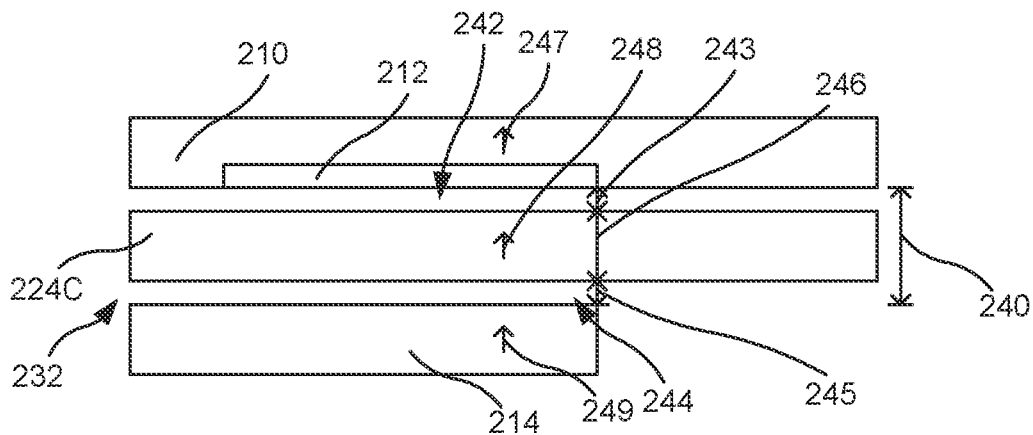
FIG. 2B is an expanded cross-section side view diagram illustrating an example portion of the electric machine of FIG. 2A near an interface of a rotor and a stator.

FIG. 2B is an expanded cross-section side view diagram illustrating an example portion of the electric machine of FIG. 2A at an interface of rotor 204 near magnets 212 and stator 206 near an outer surface of stator core 214. Medial portion 224C of stator sleeve 224 is separated from magnets 212 by a rotor gap 242 and separated from stator core 214 by a stator gap 244, such that stator sleeve 224, rotor gap 242, and stator gap 244 are contained within radial gap 232. Radial gap 232 has a radial gap thickness 240 that may change during operation of electric machine 200. Radial gap thickness 240 includes a rotor gap thickness 243 of the rotor gap, a stator gap thickness 245 of the stator gap, and a stator sleeve thickness 246 of stator sleeve 224. While reduction of stator sleeve thickness 246 may reduce radial gap thickness 240, such reduction may be limited by inclusion of sufficient material in stator sleeve 224 to maintain hoop strength for containing the pressurized cooling fluid.

To maintain a relatively small radial gap thickness 240 while maintaining an adequate rotor gap thickness 243 and stator gap thickness 245 such that stator sleeve 224 does not contact stator 206 and rotor 204, medial portion 224C of stator sleeve 224 may have a relatively low CTE compared to other portions of stator sleeve 224. In response to thermal transients, stator sleeve 224 may radially expand a relatively small distance that more closely matches expansion of stator core 214 and/or rotor body 210 than expansion of stator housing 222. For example, rotor body 210 and stator core 214 may be formed from materials having a relatively small or moderate CTE that is less than a CTE of stator housing 222. In response to a thermal transient, rotor body 210 may have a rotor radial expansion 247 and stator core 214 may have a stator radial expansion 249. Medial portion 224C may have a CTE that results in a sleeve radial expansion 248 similar enough to rotor radial expansion 247 and/or stator radial expansion 249 to maintain rotor gap 242 and stator gap 244. For example, rotor gap thickness 243 and stator gap thickness 245 may each be large enough that rotor 204 does not contact stator sleeve 224 during operation, but small enough that high power and/or cooling efficiency is maintained. For example, radial gap 232 may be less than about one centimeter.

In some examples, a CTE of medial portion 224C may be relatively close to a CTE of stator core 214, such that stator gap thickness 245 may be small. For example, flow of cooling fluid around stator core 214, rather than within slots of stator core 214, may reduce cooling of stator core 214. By maintaining a relatively small stator gap thickness 245, a greater amount of cooling fluid may flow through stator core 214, thereby removing a greater amount of heat from stator core 214.

Figure 2C:
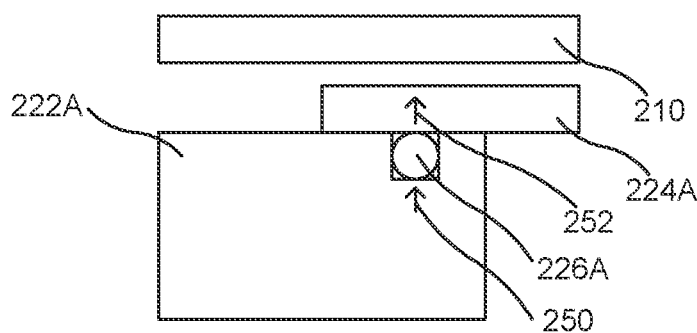
FIG. 2C is an expanded cross-section side view diagram illustrating an example portion of the electric machine of FIG. 2A near an interface of a stator housing and a stator sleeve.

While medial portion 224C of stator sleeve 224 may have a relatively low CTE, scaling portions 224A and 224B of stator sleeve 224 may have relatively high CTEs to maintain a relatively constant force on O-rings 226. FIG. 2C is an expanded cross-section side view diagram illustrating an example portion of the electric machine of FIG. 2A near an interface of stator housing 222 and stator sleeve 224. Stator sleeve 224 is configured to seal against first and second end sections 222A and 222B in response to thermal transients within an operating range of electric machine 200. To maintain a relatively constant force on O-rings 226, first and second end sections 222A and 222B of stator housing 222 are configured to expand in a manner that more closely matches expansion of end sections 222A and 222B than other portions of stator sleeve 224, such as medial portion 224C. In response to a thermal transient, stator housing 222 may have a housing radial expansion 250. Sealing portions 224A and 224B may have a CTE that results in an end sleeve radial expansion 252 similar enough to housing radial expansion 250 to maintain a relatively constant force on O-ring 226. In some examples, a CTE of each sealing portion 224A and 224B may be within about 5 ppm/° C. of a CTE of end sections 222A and 222B. For example, stator housing 222 may be fabricated from titanium having a CTE of about 9.5 ppm/° C., while each sealing portion 224A or 224B of stator sleeve 224 may be primary fabricated from glass fibers having a CTE greater than about 5 ppm/° C. The pressure within stator housing 222 may also load stator sleeve 224 outward, so a CTE of sealing portions 224A and 224B may be less than stator housing 222 to keep pressing on O-ring 226. As a result, O-rings 226 may experience reduced variability in compressive force, thereby maintaining a consistent o-ring force and compression and avoiding high stresses in the sleeve or housing.

While FIGS. 2A-2C have been described with respect to an electric machine having an internal stator and an external rotor, stator sleeves described herein may be used for other configurations of electric machines. FIG. 3 is a cross-section side view diagram illustrating an example electric machine 300 having an internal rotor 304 and an external stator 306. In the example of FIG. 3, unless otherwise stated, components of electric machine 300 may be operably similar to components of electric machine 200.

Electric machine 300 includes a shaft 302, a rotor 304, a stator 306, and a stator housing assembly 320. In the example of FIG. 3, rotor 304 is positioned internal to stator 306 and configured to rotate within stator 306. Rotor 304 is mechanically coupled to shaft 302 and includes a rotor body 310 and a permanent magnet assembly 312 positioned on an external surface of rotor body 310. Stator 306 includes a stator core 314 and stator windings 316 wrapped inside and around stator core 314. An inner surface of stator 306, such as an inner radial surface of stator core 314, is separated from permanent magnet assembly 312 of rotor 304 by a radial gap 332.

Stator housing assembly 320 includes a stator housing 322 and a stator sleeve 324. Stator housing 322 is configured to mechanically support components of stator 306 and other components of electric machine 300, such as shaft 302 and rotor 304 through bearings 330. In the example of FIG. 3, stator housing 322 includes a first end section 322A, a second end section 322B, and an outer radial section 322C that together define a stator cavity 318. First end section 322A may be separable from second end section 322B and outer radial section 322C to enable disassembly of and access to stator cavity 318, while outer radial section 222C and radially inward surfaces of end sections 322A and 322B may define a rotor cavity 319 for shaft 302 and rotor 304 to rotate.

Stator cavity 318 is configured to house stator 306, such that stator 306 may be positioned within stator cavity 318. Stator cavity 318 is configured to contain a pressurized and circulating cooling fluid. Stator housing 322 includes at least one inlet 334 and at least one outlet 336 configured to fluidically couple to a cooling fluid circulation system. Inlet 334 is configured to receive the pressurized cooling fluid into stator cavity 318 from the cooling fluid circulation system, while outlet 336 is configured to discharge the pressurized cooling fluid from stator cavity 318 back to the cooling fluid circulation system. In some examples, such as shown in FIG. 3, inlet 334 and outlet 336 may be positioned on different sides of stator core 314, such that cooling fluid may travel through stator core 314 from inlet 334 through outlet 336.

Stator sleeve 324 is radially inward of a central portion of stator housing 322 and defines a longitudinal axis 308. Stator sleeve 324 includes a first sealing portion 324A positioned against first end section 322A of stator housing 322, a second sealing portion 324B positioned against second end section 322B of stator housing 322, and a medial portion 324C between first and second sealing portions 324A and 324B and positioned in radial gap 332. Medial portion 324C is configured to form an inner lateral fluid boundary of stator cavity 318.

Stator housing 322 and stator sleeve 324 are configured to seal stator cavity 318, such that the cooling fluid may only enter and exit from stator cavity 218 through inlet 334 and outlet 336. An inner radial surface of each of first and second end sections 322A and 322B of stator housing 322 includes one or more grooves extending around longitudinal axis 308. Some grooves are configured to receive at least one O-ring 326 and position O-ring 326 radially inward. To seal stator cavity 318, stator sleeve 324 is positioned against first and second end sections 322A and 322B of stator housing 322 and within radial gap 332. First sealing portion 324A of stator sleeve 324 is configured to position against an O-ring 326 positioned around first end section 322A of stator housing 322, and second sealing portion 324B of stator sleeve 324 is configured to position against an O-ring 326 positioned around second end section 322B of stator housing 322.

In contrast to electric machine 200 of FIG. 2A, in which cooling fluid exerts a pressure on an inner radial surface of stator sleeve 224, in electric machine 300, cooling fluid exerts a pressure on an outer radial surface of stator sleeve 324. Further, expansion of stator housing 322 in response to a thermal transient exerts less, rather than more, force on O-rings 326, as stator housing 322 expands away from longitudinal axis 308 as stator housing 322 increases in temperature. To maintain a constant force on O-rings 326 while maintaining a small radial gap 332, stator sleeve 324 may be configured with a variable CTE, that that a CTE of each of first and second sealing portions 324A, 224B is greater than a CTE of medial portion 324C. For example, first and second sealing portions 324A and 324B of stator sleeve 324 may expand at a rate substantially similar to stator housing 322, such that a relatively consistent force is maintained on O-rings 326 during thermal transients.

Figure 4A:
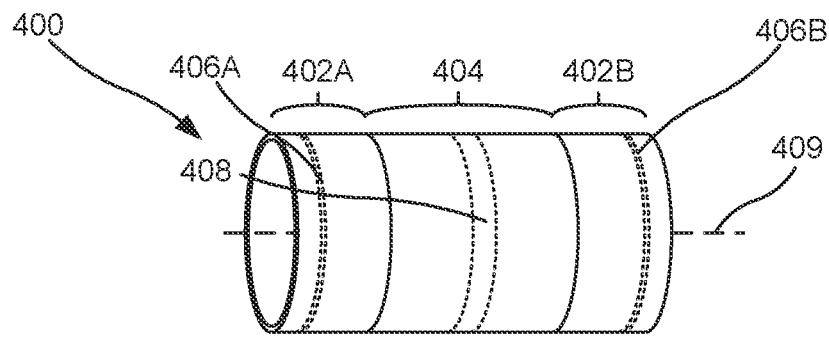
FIG. 4A is a perspective view diagram illustrating an example stator sleeve of an electric machine.

FIG. 4A is a perspective view diagram illustrating an example stator sleeve 400 of an electric machine. Portions of stator sleeve 400 that are configured to contact a stator housing or other support may have a composition that more closely matches a CTE of the housing, while portions of stator sleeve that are configured to remain within a gap between a stator and a rotor may have a composition that more closely matches a CTE of the stator and/or rotor. In the example of FIG. 4A, stator sleeve 400 includes a first sealing portion 402A, a second sealing portion 402B, and a medial portion 404. First scaling portion 402A corresponds to an O-ring 406A of a first end section of a stator housing, while second sealing portion 402B corresponds to an O-ring 406B of a second end section of the stator housing. Medial portion 404 corresponds to a radial gap 408 between a stator and magnets of a rotor. A length and/or position of each of scaling portion 402A and 402B and medial portion 404 may be selected based on a corresponding position of O-rings 406A and 406B and radial gap 408. In some examples, each sealing portion 402A and 402B may be an end-most ten percent of stator sleeve 400.

Stator sleeve 400 includes a plurality of layers of composite materials. The composite material of each layer includes a polymer matrix and one or more high strength fiber materials embedded in the polymer matrix. The plurality of layers may be selected such that stator sleeve includes more than one type of high strength fiber material. For example, different layer and/or different portions within a layer may include different high strength fiber materials. Each high strength fiber material may include high strength fibers that are oriented in one or more directions, including aligned fibers, woven fibers, fabrics, and the like.

Figure 4B:
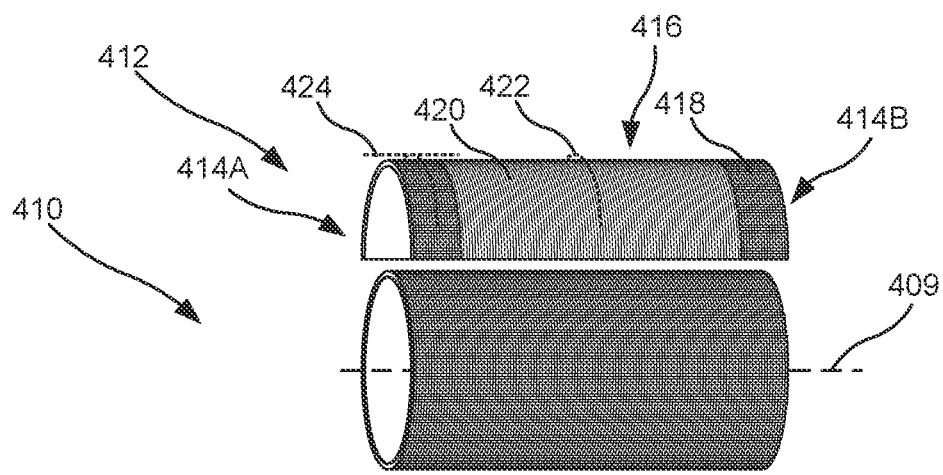
FIG. 4B is an exploded perspective view diagram illustrating two sections of the example stator sleeve of FIG. 4A.

To provide varying properties along a length of stator sleeve 400, such as CTE and strength, stator sleeves 400 may have a variable composition and/or orientation of the high strength fiber materials at different longitudinal portions of stator sleeve 400. A composition and direction of orientation of the high strength fiber materials in stator sleeve 400 may be configured to reduce radial deflections in a center of stator sleeve 400 due to a change in temperature or pressure. To vary a composition and/or orientation of materials of stator sleeve 400, stator sleeve 400 may have radial sections (or layers) of materials having varying compositions, orientations, and/or lengths. FIG. 4B is an exploded perspective view diagram illustrating two layers 410 and 412 of the example stator sleeve 400 of FIG. 4A.

Stator sleeve 400 may be subject to tensile (e.g., for an internal stator) or compressive (e.g., for an external stator) forces. To provide hoop strength to adequately resist these forces, stator sleeve 400 includes a plurality of carbon fibers 420. Carbon fibers 420 may have a relatively low CTE and a high tensile strength. Carbon fibers 420 may provide a high degree of hoop strength to stator sleeve 400, such that stator sleeve 400 may resist pressures exerted by the contained cooling fluid. However, carbon fibers 420 may also have a high electrical conductivity, such that carbon fibers 420 that are oriented with a longitudinal component may be subject to induced eddy currents from the magnetic field generated by the electric machine. To reduce generation of eddy currents, stator sleeve 400 includes carbon fibers 420 that are oriented unidirectionally in a circumferential direction 422 around longitudinal axis 409, such that the carbon fibers 420 do not include a substantial longitudinal component.

While carbon fibers 420 may resist forces exerted by the pressurized cooling fluid, carbon fibers 420 may have a low CTE that may otherwise limit expansion of a stator sleeve at portions of the stator sleeve that contact a housing. In addition to carbon fibers 420, stator sleeve 400 includes a plurality of glass fibers 418. Glass fibers 418 may have a relatively high CTE (e.g., between about 5 ppm/° C. and about 12 ppm/° C.), a moderate tensile strength, a low thermal conductivity (e.g., less than about 1 W/m·K), and a low electrical conductivity. Glass fibers 418 may include any amorphous silica-based fiber including, but not limited to, borosilicate glass, alumino-borosilicate glass with or without alkali oxides, alkali-lime glass with or without alkali-oxides, or any other glass. To provide longitudinal strength along stator sleeve 400, stator sleeve 400 includes glass fibers that are oriented multi-directionally to provide both hoop strength around and longitudinal strength along stator sleeve 400. For example, glass fibers may be oriented bidirectionally, including a circumferential direction 422 around longitudinal axis 409 and a longitudinal direction 424 along longitudinal axis 409.

To configure stator sleeve 400 such that a CTE of each of first and second sealing portions 402A and 402B is greater than a CTE of medial portion 404, a proportion of glass fibers to carbon fibers is higher in the first and second sealing portions 402A and 402B than medial portion 404. For example, a ratio of a volume of glass fibers to a volume of carbon fibers in each sealing portion 402 is greater than a ratio of a volume of glass fibers to a volume of carbon fibers in medial portion 404. In response to a thermal transient, the higher proportion of glass fibers having a relatively high CTE may expand to a greater extent than the lower proportion of carbon fibers having a relatively low CTE.

The example of FIG. 4B includes a first layer 410 having a same composition along longitudinal axis 409 and a second layer 412 having a varying composition along longitudinal axis 409. First layer 410 includes a plurality of glass fibers 418 through an entire length of first layer 410. As a result, first layer 410 may contribute to a CTE of stator sleeve 400 relatively uniformly. In contrast, second layer 412 includes a first sealing portion 414A and a second sealing portion 414B, each having a plurality of glass fibers 418, and a medial portion 416 having a plurality of carbon fibers 420. As a result, first and second sealing portions 414A and 414B may expand to a greater extent than medial portion 416.

Figure 4C:
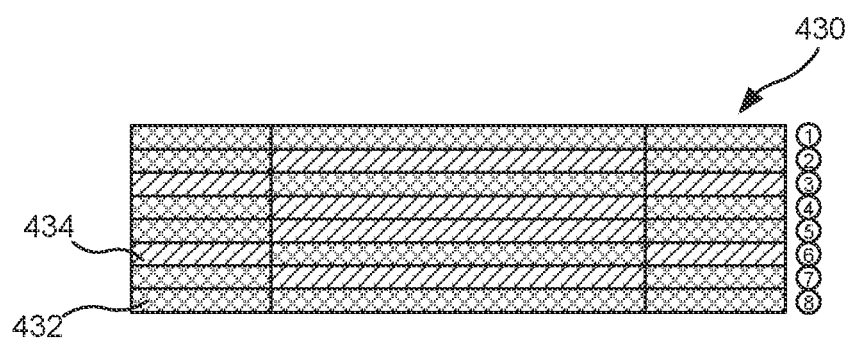
FIG. 4C is a cross-section side view diagram illustrating a stack of plies used to form the example stator sleeve of FIG. 4A.

In examples in which stator sleeve 400 is formed using a ply lay-up method, such as will be described in FIG. 5, sections of stator sleeve 400 may correspond to different plies used to form stator sleeve 400. FIG. 4C is a cross-section side view diagram illustrating a set of plies 430 used to form the example stator sleeve 400 of FIG. 4A. In the example of FIG. 4C, set of plies 430 forms 8 layers, as numbered to the right of set of plies 430.

In some examples, set of plies 430 includes one or more carbon plies 434 having a plurality of carbon fibers and one or more glass plies 432 having a plurality of glass fibers. While illustrated as only extending for a section, the set of plies may extend any length, including across more than one section of stator sleeve 400. Each carbon ply 434 and glass ply 432 may provide corresponding material properties to a portion of stator sleeve 400. For example, carbon ply 434 may provide hoop strength to stator sleeve 400, while glass ply 432 may provide longitudinal strength and thermal insulation to stator sleeve 400. In some examples, glass plies 432 provide galvanic isolation to stator sleeve 400. For example, stator sleeve 400 may define an inner radial surface and an outer radial surface. A glass ply 432 may be a radially inner-most ply and a radially outer-most ply of set of plies 430, such that glass fibers line the inner and outer radial surfaces of stator sleeve 400 in layers 8 and 1, respectively.

To define sealing portions 402A and 402B having relatively high CTEs and a medial portion 404 having a relatively low CTE, the plurality of plies include carbon fibers that are present in a higher proportion of medial portion 404 than sealing portions 402A and 402B. Corresponding, set of plies 430 may include layers having carbon plies that do not have a uniform composition and/or do not extend a full length of stator sleeve 400. For example, carbon plies in set of plies 430 may carbon plies 434 positioned within medial portion 404, such as illustrated in layers 2, 4, 5, and 7. These carbon plies 434 may be present in a mixed ply or layer, such as in combination with one or more glass plies 432. For example, a carbon ply 434 may be cured in place adjacent to one or more glass plies 432 to form a medial section having a carbon portion corresponding to carbon ply 434 and a glass portion corresponding to glass ply 432. Carbon plies 434 have a lower CTE than glass plies 432, and so may expand to a lesser extent. These carbon plies 434 may provide hoop strength to medial portion 404, which may be subject to greater expansion forces than sealing portions 402 closer to ends of stator sleeve 400, without substantially increasing an amount of expansion in response to thermal transients due to the lower CTE of carbon plies 434.

While illustrated in FIG. 4C as being mirrored between longitudinal halves of stator sleeve 400, in other examples, stator sleeve 400 may not be longitudinally mirrored. As one example, stator sleeve 400 may contact a stator housing having different temperatures along a longitudinal axis, such that ends of stator sleeve 400 may expand differently. As another example, a portion of stator sleeve 400 near a gap between the rotor and stator may not be at a center of stator sleeve 400, such that medial portion 404 may be at a different longitudinal position along stator sleeve 400. Rather, the configurations and fabrication techniques described for stator sleeve 400 may be used to form stator sleeve 400 having a variety of thermal expansion profiles (i.e., a degree or rate of thermal expansion with respect to a change in temperature along a longitudinal axis).

Each ply in set of plies 430 may have various parameters that influence properties of the corresponding layer. These parameters may include, but are not limited to, a resin type and % content, a fiber type, fiber weight, filament count, and fiber structure (e.g., woven, braided, UD tape). Set of plies 430 may include plies having any form or composition. For example, each glass ply 432 may include a glass fabric having a plurality of glass fibers that are woven together and oriented in more than one direction, such as oriented longitudinally along longitudinal axis 409 and circumferentially around longitudinal axis 409. Each carbon ply 434 may include a carbon fiber tape having a plurality of carbon fibers that are aligned and oriented in a single direction, such as oriented circumferentially around longitudinal axis 409. In some examples, different glass plies 432 and/or carbon plies 434 may have different compositions and/or thicknesses. For example, plies that are closer to an inner radial surface of stator sleeve 400 may have greater thicknesses than plies located radially outward.

Set of plies 430 may include any number of plies. A number of plies 430 may be sufficient to provide a desired variation in properties based on the composition and orientation of the high strength fiber materials of the plies. For example, as illustrated in FIG. 4C, at the ends of stator sleeve 400, set of plies 430 may include 1 or 2 carbon plies 434 and 3 to 6 plies of glass plies 432, while at the middle of stator sleeve 400, set of plies 430 may swap carbon plies 434 for glass plies 432.

Set of plies 430 defines a thickness of stator sleeve 400. Glass fabric plies may typically have a thickness of about 0.25 mm (or 0.010 inches), with a resin content of about 37%. Unidirectional carbon tape may typically have a thickness of about 0.13 mm (or 0.005 inches) to about 0.18 mm (or 0.007 inches), with a resin content of about 35%. Woven carbon fabric may typically have a thickness of about 0.29 mm (or about 0.011 inches) to about 0.38 mm (or about 0.015 inches), with a resin content of 37%. Woven carbon may only be in the ends of stator sleeve 400, but may provide better axial stiffness/CTE decrease.

In some examples, stator sleeve 400 may have a thickness from about 0.04 to about 0.4 inches and/or a thickness from about 4 plies to about 40 plies. In some examples, stator sleeve 400 may have a thickness from about 0.06 to about 0.25 inches and/or a thickness from about 6 plies to about 25 plies. Set of plies 430 also defines a length of stator sleeve 400. In some examples, stator sleeve 400 may have a length from about 3 inches to about 20 inches, and may correspond to a length of stator. Each glass ply 432 and carbon ply 434 may have a length from about 1 to about 15 inches. Set of plies 430 also defines an inner and an outer diameter of stator sleeve 400. In some examples, stator sleeve 400 may define an inner diameter from about 2 inches and an outer diameter to about 30 inches.

In some instances, strength may not be the limiting factor for stator sleeve 400; rather, decreasing deflections may limit a thickness of stator sleeve 400, and higher modulus help decrease deflections. Typically, more filaments are cheaper, and intermediate modulus may provide increased benefit over standard modulus if stiffness instead of strength alone is driving the design. Filaments (or fibers) may have a variety of sizes. In some examples, a diameter of high strength fibers may be between about 1 micron and about 10 microns. For example, IM7 filament diameter may be 5.2 microns, AS4 may be about 7.1 microns, E-glass fiber in 7781 may be about 6 microns, and E-glass fiber in 1581 may be about 9 microns.

Set of plies 430 may include a variety of types of high strength fibers. Such high strength fibers may include, but are not limited to, standard modulus carbon fibers, intermediate modulus carbon fibers, S-glass fibers, E-glass fibers, basalt fibers, aramid fibers, and the like. High strength fibers may have a variety of properties. Carbon fibers may have an elastic modulus greater than about 200 GPa and a tensile strength greater than about 4000 MPa. For example, standard carbon fibers may have an elastic modulus of ~230 GPa and a tensile strength of 4500 MPa (AS4), while intermediate modulus would have elastic modulus of ~280 GPa and strength of 5700 MPa (IM7). Glass fibers may have an elastic modulus greater than about 30 GPa and a tensile strength greater than about 2000 MPa. For example, E-glass would have a tensile strength of about 2600 MPa and an elastic modulus of about 40 GPa, and S-2 glass would have a tensile strength of about 4800 MPa and an elastic modulus of about 90 GPa. Basalt has a high positive CTE like E-Glass and slightly higher modulus (89 GPa) and strength like S-2 Glass (4800 MPa). Aramid has a tensile strength of around 3000 MPa and a tensile modulus of about 110 GPa.

In some examples, a high strength fiber material may include a hybrid weave of more than one type of high strength fiber. For example, a hybrid high strength fiber material may include hoop-wise carbon with glass fibers running axially. Such a ply could be turned 90 degrees at the ends of the sleeve (where magnetic field is not as intense and thus less eddy current risk).

Set of plies 430 may include a variety of types of resin. Such resins may include, but are not limited to, epoxy, benzoxazine, bismaleimide, cyanate ester, and the like. The resin may have a high temperature capability. For example, cured epoxy may have an operating range up to about 230° C.).

High strength fibers may have a variety of electrical properties. For example, carbon fibers conduct electricity, and so interfere with the electric machine if not carefully designed around, as discussed above. In contrast, glass does not conduct electricity, and so would not interfere with machine efficiency/output. Aramid does not conduct electricity and has a larger negative CTE than carbon, so could be used to modify the expansion of different portions of stator sleeve 400 as well, without interfering with machine efficiency/output.

Selection of high strength fiber materials and resin may result in composite materials having various properties. For example, when combined with resin, UD IM7 12K tape in epoxy composite may have an elastic modulus of about 153 GPa, a tensile strength of about 2500 MPa tensile strength (in the hoop direction), and a CTE of about $1 \times 10^{-6}$° C. Glass-reinforced epoxy may have an elastic modulus of about 27 GPa, a tensile strength of about 427 MPa, and a CTE of about $12 \times 10^{-6}$° C. Depending on a particular composition of a portion of stator sleeve 400, the portion may have a hoopwise modulus of about 60 to 120 GPa, a tensile strength of about 900 to 2000 MPa, and a CTE of about 3 to $7 \times 10^{-6}$° C. as examples. A stiffness of the carbon biases the CTE in its favor more than simply averaging CTE on a thickness basis, so not likely to see high CTE close to glass alone even if glass is dominate in a stack-up, particularly with intermediate modulus carbon.

The resulting deflection of stator sleeve 400 may depend on a variety of factors including length of stator sleeve 400, the coolant pressure of the electric machine, the temperature of the system, the CTE of the medial portion of stator sleeve 400, and the like. In some examples, a deflection may be from about 0.13 mm (or about 0.005 inches) to about 0.76 mm (or about 0.030 inches). A deflection may be related to a length of stator sleeve 400, such that the deflection may be defined relative to the length of stator sleeve 400. In some examples, a ratio of deflection to length of stator sleeve 400 is less than about 1:100, such as less than about 1:500. In some examples, a deflection may be negative. The radial gap between the stator and the rotor in which stator sleeve 400 is positioned must account for a thickness of stator sleeve 400, thermal and pressure deflections, various operational clearances needed for installation (accelerations and out of balances), and manufacturing tolerances.

As described in FIG. 4C, stator sleeves described herein may be formed using a set of plies. FIG. 5 is a flowchart of an example method for fabricating an example stator sleeve of an electric machine. The example of FIG. 5 describes a lay-up method for forming stator sleeves described herein. However, other methods may be used to form the stator sleeves.

Figure 5:
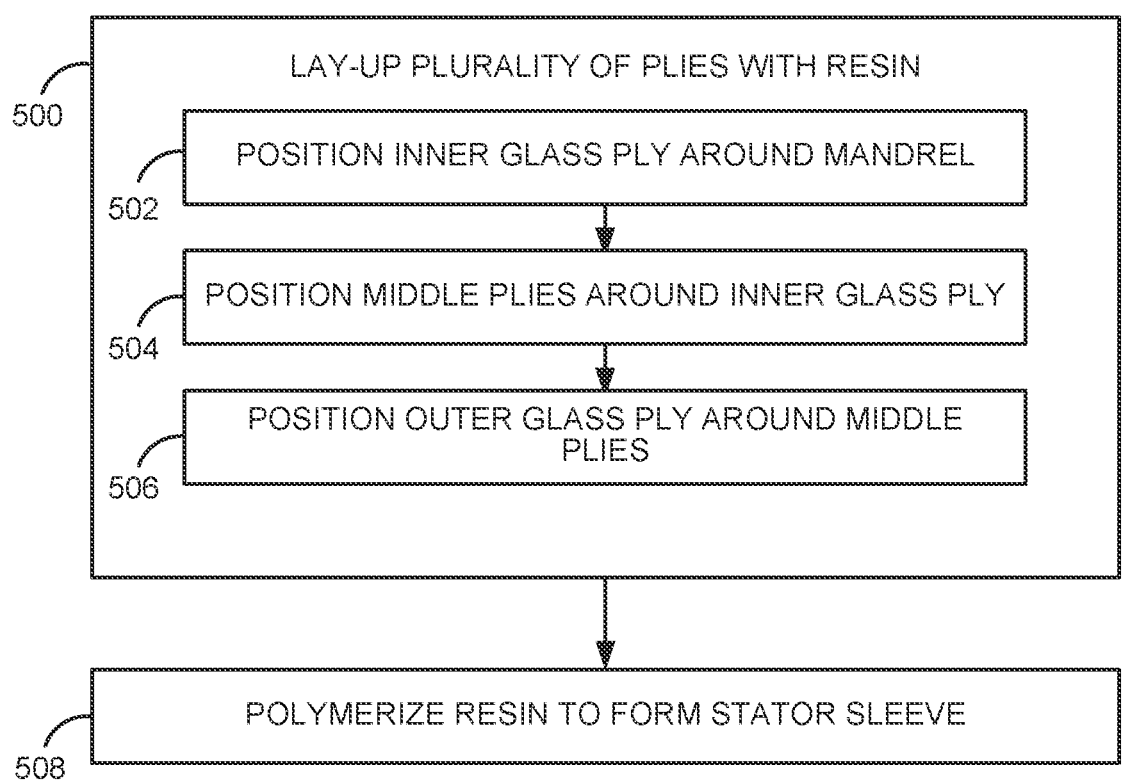
FIG. 5 is a flowchart of an example method for fabricating an example stator sleeve of an electric machine.

The method of FIG. 5 includes laying-up a plurality of plies with resin (500). The plurality of plies may include a variety of types of plies, including one or more glass plies that each include a plurality of glass fibers oriented multi-directionally around and along a longitudinal axis and one or more carbon plies that each include a plurality of carbon fibers oriented unidirectionally around the longitudinal axis. The resin may be impregnated into each ply, may be applied between plies, and/or may be present on or within each ply. For example, glass plies may include a glass fabric having a resin impregnated into the glass fabric, while carbon plies may include carbon tape having resin adjacent to carbon fibers. The ends of each ply and, in the case of mixed plies, sides of each adjacent ply, may be bonded or otherwise secured, such that each ply may form a layer around the mandrel.

Referring to FIG. 4C, the method includes positioning an inner glass ply around a mandrel (502). This inner glass ply may line an inner radial surface of a resulting stator sleeve with galvanic isolation. The method further includes positioning one or more middle plies around the inner glass ply (504). These middle plies include at least one carbon ply, such as carbon ply 434, and at least one glass ply, such as glass ply 432, that do not extend a full length of the stator sleeve, such that a medial portion of the stator sleeve has a lower CTE than sealing portions of the stator sleeve. The middle plies may further include carbon plies 434 and glass plies 432 to provide additional mechanical and/or thermal properties to the stator sleeve. The method further includes positioning an outer glass ply around the middle plies (506). Like the inner glass ply, the outer glass ply may line an outer radial surface of the resulting stator sleeve with galvanic isolation.

The method of FIG. 5 includes polymerizing the resin to form the stator sleeve (508). The resulting stator sleeve defines the longitudinal axis and includes a first sealing portion, a second sealing portion, and a medial portion between the first and second sealing portions, in which a CTE of each of the first and second sealing portions is greater than a CTE of the medial portion.

Figure 6:
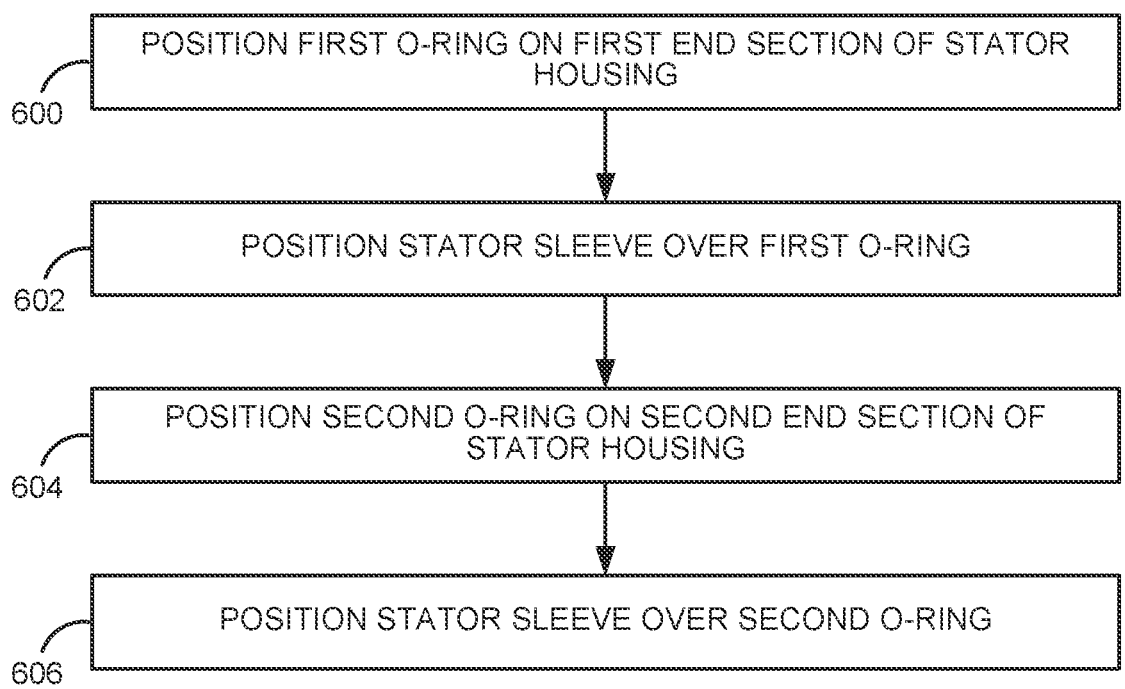
FIG. 6 is a flowchart of an example method for assembling a stator assembly of an electric machine.

Stator sleeves described herein may be configured to couple to a stator housing in a manner that is simple and/or reduces damage to O-rings. FIG. 6 is a flowchart of an example method for assembling a stator assembly of an electric machine, and will be explained with reference to electric machine 200 of FIG. 2A. The method includes positioning first O-ring 226A on first end section 222A of stator housing 222 (600) and positioning stator sleeve 224 over first O-ring 226A (602). Stator sleeve 224 may be slid longitudinally past first O-ring 226A, such that an end of stator sleeve 224 past second sealing portion 224B may be positioned past a groove in second end section 222B for holding second O-ring 226B. The method further includes positioning second O-ring 226B on second end section 222B of stator housing 222 (604) and positioning stator sleeve 224 over second O-ring 226B (606), such that first sealing portion 224A is positioned over first O-ring 226A and second sealing portion 224B is positioned over second O-ring 226B. A length of stator sleeve 224 may be only slightly longer than a distance between O-rings 226A and 226B, such that an amount of stator sleeve 224 that may slide over O-rings 226 may be reduced. For example, a length of stator sleeve 224 may be less than about 5 centimeters greater than a distance between O-rings 226A and 226B. Such length may be limited by a difficulty of mounting stator sleeve 224 over O-rings 226A and 226B and an increased likelihood of rolling or trapping O-ring 226A or 226B.

Examples of electric machines with stator cooling that may use one or more techniques of this disclosure include permanent magnet machines either alternating or direct current, field wound machines with exciter windings, switched reluctance machines, and induction motors or generators. Examples of applications that may use one or more techniques of this disclosure include engine mounted motors and generators, embedded engine electric machines, automotive and other transportation vehicle motors including propulsion motors, motors that drive fans, compressors, pumps, centrifuges or hoists, generators that are driven by turbines or windmills.

Example 1: A stator housing assembly includes a stator housing defining a stator cavity configured to contain a pressurized cooling fluid; and a stator sleeve defining a longitudinal axis and configured to encase the stator cavity, wherein the stator sleeve comprises a plurality of layers of composite materials that include more than one high strength fiber material.

Example 2: The stator housing assembly of example 1, wherein a composition and direction of orientation of the high strength fiber materials varies along the longitudinal axis.

Example 3: The stator housing assembly of any of examples 1 and 2, where a composition and direction of orientation of the high strength fiber materials is configured to reduce radial deflections in a center of the stator sleeve due to a change in temperature or pressure.

Example 4: The stator housing assembly of any of examples 1 through 3, wherein the stator housing defines a first end section and a second end section that define the stator cavity, and wherein the stator sleeve includes: a first sealing portion configured to position against the first end section of the stator housing; a second sealing portion configured to position against the second end section of the stator housing; and a medial portion between the first and second sealing portions.

Example 5: The stator housing assembly of example 4, wherein a coefficient of thermal expansion (CTE) of each of the first and second sealing portions of the stator sleeve is greater than a CTE of the medial portion.

Example 6: The stator housing assembly of any of examples 4 and 5, a composition of the composite materials of the plurality of layers of the first and second sealing portions is different from a composition of the composition materials of the plurality of layers of the medial portion.

Example 7: The stator housing assembly of any of examples 4 through 6, wherein the high strength fiber materials include a plurality of carbon fiber and a plurality of glass fibers.

Example 8: The stator housing assembly of example 7, wherein a proportion of glass fibers to carbon fibers is higher in the first and second sealing portions than the medial portion.

Example 9: The stator housing assembly of any of examples 7 and 8, wherein the stator sleeve defines an inner radial surface and an outer radial surface, and wherein the plurality of glass fibers line the inner and outer radial surfaces.

Example 10: The stator housing assembly of any of examples 7 through 9, wherein the plurality of carbon fibers are oriented circumferentially around the longitudinal axis, and wherein the plurality of glass fibers are oriented multi-directionally around and along the longitudinal axis.

Example 11: The stator housing assembly of any of examples 4 through 10, wherein each of the first and second end sections of the stator housing comprises one or more grooves extending around the longitudinal axis, each groove configured to receive at least one O-ring, wherein the first sealing portion is configured to position against an O-ring positioned around the first end section of the stator housing, and wherein the second sealing portion is configured to position against an O-ring positioned around the second end section of the stator housing.

Example 12: An electric machine includes a shaft; a rotor coupled to the shaft and includes a stator housing defining a stator cavity configured to contain a pressurized cooling fluid, wherein the stator is positioned within the stator cavity; and a stator sleeve defining a longitudinal axis and positioned against the stator housing and within the radial gap, wherein the stator sleeve comprises a plurality of layers of composite materials that include more than one high strength fiber material.

Example 13: The electric machine of example 12, wherein a composition and direction of orientation of the high strength fiber materials varies along the longitudinal axis.

Example 14: The electric machine of any of examples 12 and 13, where a composition and direction of orientation of the high strength fiber materials is configured to reduce radial deflections in a center of the stator sleeve due to a change in temperature or pressure.

Example 15: A method of fabricating a stator sleeve includes laying-up a plurality of plies with high strength fibers and resin; and polymerizing the resin to form the stator sleeve, wherein the stator sleeve defines a longitudinal axis and comprises a plurality of layers of composite materials that include more than one high strength fiber material.

Example 16: The method of example 15, wherein the plurality of plies comprises: one or more glass plies, each comprising a plurality of glass fibers; and one or more carbon plies, each comprising a plurality of carbon fibers oriented unidirectionally around the longitudinal axis.

Example 17: The method of any of examples 15 and 16, wherein the stator sleeve includes: a first sealing portion; a second sealing portion; and a medial portion between the first and second sealing portions, wherein the plurality of plies use different combinations high strength fibers for the medial portion and the sealing portions of the stator sleeve.

Example 18: The method of example 17, wherein the one or more carbon plies comprise: one or more long carbon plies extending a length of the stator sleeve; and one or more short carbon plies positioned within the medial portion.

Example 19: The method of any of examples 17 and 18, wherein the plurality of plies further comprises one or more mixed plies, each includes a glass portion positioned within the first and second sealing portions and comprising a plurality of glass fibers; and a carbon portion positioned within the medial portion and comprising a plurality of carbon fibers.

Example 20: The method of any of examples 17 through 19, wherein a coefficient of thermal expansion (CTE) of each of the first and second sealing portions of the stator sleeve is greater than a CTE of the medial portion.

Various examples have been described. These and other examples are within the scope of the following claims.

What is claimed is:

1. A stator housing assembly, comprising:
   a stator housing defining a stator cavity configured to contain a pressurized cooling fluid; and
   a stator sleeve defining a longitudinal axis and configured to encase the stator cavity,
   wherein the stator housing defines a first end section and a second end section that define the stator cavity,
   wherein the stator sleeve comprises a plurality of layers of composite materials that include more than one high strength fiber material,
   wherein the stator sleeve includes:
      a first sealing portion configured to position against the first end section of the stator housing;
      a second sealing portion configured to position against the second end section of the stator housing: and
      a medial portion between the first and second sealing portions,
   wherein the high strength fiber materials include a plurality of carbon fibers and a plurality of glass fibers, and
   wherein a proportion of glass fibers to carbon fibers is higher in the first and second sealing portions than the medial portion.

2. The stator housing assembly of claim 1, wherein a composition and direction of orientation of the high strength fiber materials varies along the longitudinal axis.

3. The stator housing assembly of claim 1, where a composition and direction of orientation of the high strength fiber materials is configured to reduce radial deflections in a center of the stator sleeve due to a change in temperature or pressure.

4. The stator housing assembly of claim 1, wherein a coefficient of thermal expansion (CTE) of each of the first and second sealing portions of the stator sleeve is greater than a CTE of the medial portion.

5. The stator housing assembly of claim 1, a composition of the composite materials of the plurality of layers of the first and second sealing portions is different from a composition of the composite materials of the plurality of layers of the medial portion.

6. The stator housing assembly of claim 1,
   wherein the stator sleeve defines an inner radial surface and an outer radial surface, and
   wherein the plurality of glass fibers line the inner and outer radial surfaces.

7. The stator housing assembly of claim 1,
   wherein the plurality of carbon fibers are oriented circumferentially around the longitudinal axis, and
   wherein the plurality of glass fibers are oriented multi-directionally and include a first plurality of glass fibers oriented around the longitudinal axis and a second plurality of glass fibers oriented along the longitudinal axis.

8. The stator housing assembly of claim 1,
wherein each of the first and second end sections of the stator housing comprises one or more grooves extending around the longitudinal axis, each groove configured to receive at least one O-ring,
wherein the first sealing portion is configured to position against an O-ring positioned around the first end section of the stator housing, and
wherein the second sealing portion is configured to position against an O-ring positioned around the second end section of the stator housing.

9. An electric machine, comprising:
a shaft;
a rotor coupled to the shaft and comprising a permanent magnet assembly;
a stator comprising a stator core separated from the permanent magnet assembly of the rotor by a radial gap; and
a stator housing assembly comprising:
a stator housing defining a stator cavity configured to contain a pressurized cooling fluid, wherein the stator is positioned within the stator cavity; and
a stator sleeve defining a longitudinal axis and positioned against the stator housing and within the radial gap,
wherein the stator housing defines a first end section and a second end section that define the stator cavity,
wherein the stator sleeve comprises a plurality of layers of composite materials that include more than one high strength fiber material,
wherein the stator sleeve includes:
a first sealing portion configured to position against the first end section of the stator housing;
a second sealing portion configured to position against the second end section of the stator housing; and
a medial portion between the first and second sealing portions,
wherein the high strength fiber materials include a plurality of carbon fibers and a plurality of glass fibers, and
wherein a proportion of glass fibers to carbon fibers is higher in the first and second sealing portions than the medial portion.

10. The electric machine of claim 9, wherein a composition and direction of orientation of the high strength fiber materials varies along the longitudinal axis.

11. The electric machine of claim 9, where a composition and direction of orientation of the high strength fiber materials is configured to reduce radial deflections in a center of the stator sleeve due to a change in temperature or pressure.

12. A method of fabricating a stator sleeve, comprising:
laying-up a plurality of plies with high strength fibers and resin; and
polymerizing the resin to form the stator sleeve, wherein the stator sleeve defines a longitudinal axis and comprises a plurality of layers of composite materials that include more than one high strength fiber material,
wherein the stator sleeve is configured to encase a stator cavity configured to contain a pressurized cooling fluid,
wherein the stator sleeve includes:
a first sealing portion configured to position against a first end section of a stator housing;
a second sealing portion configured to position against a second end section of the stator housing; and
a medial portion between the first and second sealing portions,
wherein the more than one high strength fiber material includes a plurality of carbon fibers and a plurality of glass fibers, and
wherein a proportion of glass fibers to carbon fibers is higher in the first and second sealing portions than the medial portion.

13. The method of claim 12, wherein the plurality of plies comprises:
one or more glass plies, each comprising the plurality of glass fibers; and
one or more carbon plies, each comprising the plurality of carbon fibers oriented unidirectionally around the longitudinal axis.

14. The method of claim 13, wherein the one or more carbon plies comprise:
one or more long carbon plies extending a length of the stator sleeve; and
one or more short carbon plies positioned within the medial portion,
wherein each of the one or more short carbon plies extends less than the length of the stator sleeve.

15. The method of claim 12,
wherein the plurality of plies use different combinations of high strength fibers for the medial portion and the first and second sealing portions of the stator sleeve.

16. The method of claim 15, wherein the plurality of plies further comprises one or more mixed plies, each comprising:
a glass portion positioned within the first and second sealing portions and comprising the plurality of glass fibers; and
a carbon portion positioned within the medial portion and comprising the plurality of carbon fibers.

17. The method of claim 15, wherein a coefficient of thermal expansion (CTE) of each of the first and second sealing portions of the stator sleeve is greater than a CTE of the medial portion.

* * * * *